Feb. 3, 1948.  R. P. MARTIN  2,435,401
AUXILIARY PROPELLER DRIVE
Filed April 24, 1942

INVENTOR.
R. P. Martin

Patented Feb. 3, 1948

2,435,401

UNITED STATES PATENT OFFICE 2,435,401

AUXILIARY PROPELLER DRIVE

Robert P. Martin, Seattle, Wash.

Application April 24, 1942, Serial No. 440,331

1 Claim. (Cl. 244—53)

This invention relates to improvements in aircraft, in which air turbines operate in conjunction with internal combustion engines to stabilize the aircraft; and the object of my invention is to provide an adjustable conical air intake of reduced conical outlet tubes to supply the air turbines, mounted adjacent gas motors to assist and substitute horsepower created by air turbines to rotate shafts to drive propellers.

I attain these objects by mechanism illustrated in the accompanying drawings, in which like numerals indicate similar parts throughout the drawings.

Figure 1:
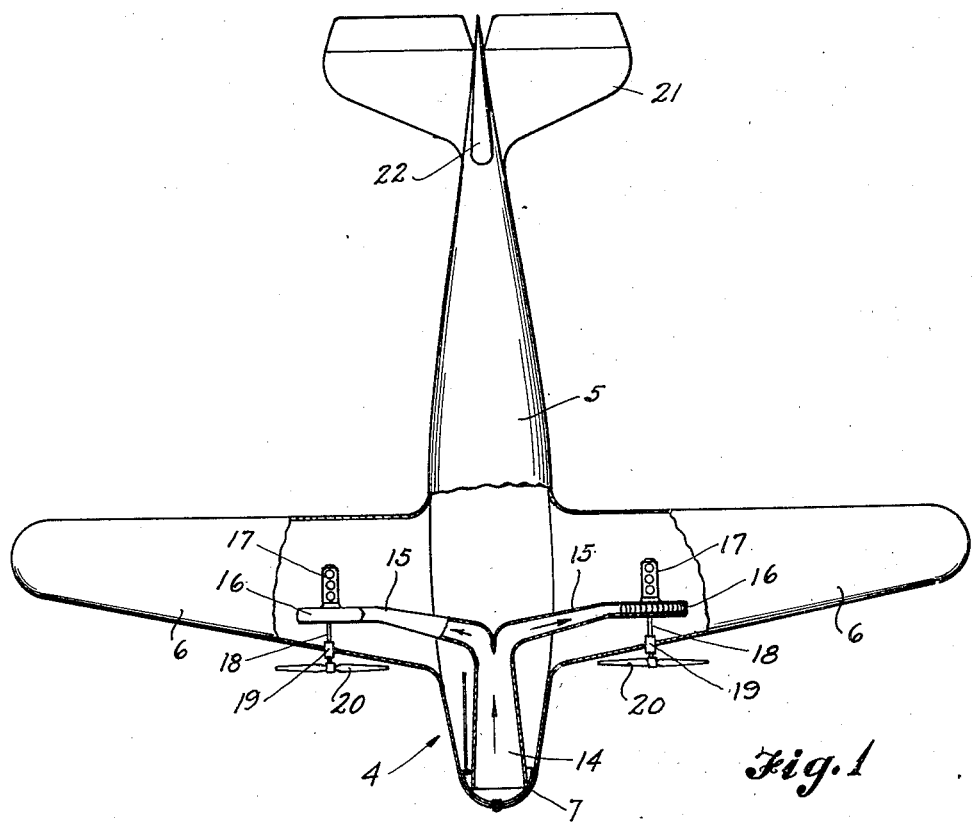
Figure 1 is a plan view partly in section.

The invention is shown applied to an airplane designated in Fig. 1 by the numeral 4 having a fuselage 5 and opposite wings 6.

Figure 2:
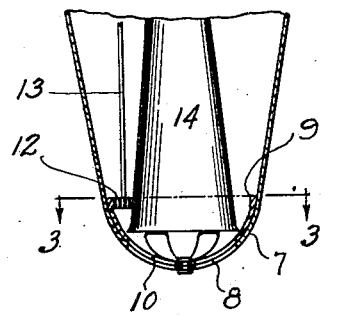
Figure 2 is a fragmental enlarged section disclosing the bow end of the aircraft.
Figure 3:
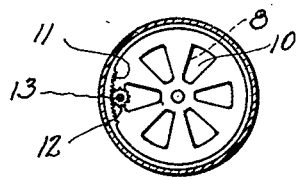
Figure 3 is a section taken on line 3—3 of Figure 2, disclosing the controlled air intake damper.

The forward end of the fuselage is formed with a rounded nose portion 7 that is slotted at 8, as shown in Figs. 2 and 3. The nose portion 7 is semi-spherical with a rounded cross-section as indicated in Fig. 3, to receive therein a rotatable shutter 9 that is journaled on a pin at its center to rotate within the nose portion 7. The shutter 9 is formed with slots 10 in position to register with the slots 8 in the nose portion 7, and slots 8 form a grill in the nose portion that is adjustable in size and capacity by rotation of the shutter 9.

Provision is made to shift the position of the shutter, for which purpose I have provided an internal segmental ring gear 11 on the inner edge thereof and a pinion 12 in mesh therewith. The pinion 12 is mounted on a shaft 13 that extends backward through the fuselage to a point within convenient reach of the pilot for ready adjustment of the shutter as may be required.

Mounted in the fuselage, particularly in the nose portion thereof, is an enlarged air tube 14, uniformly tapered in cross section, having the open enlarged end thereof just behind the grill 8 in position to receive air therethrough, under control of the shutter 9. The air tube 14 terminates at its rearward end in laterally extending air tubes 15 which project therefrom to air turbines 16. The air tubes 15 are also tapered uniformly in cross section, and like the tube 14, converge in the direction of the air flow therethrough, thus increasing the velocity of the air toward the discharge ends thereof. These air tubes form an air tunnel extending through the nose portion of the fuselage and into the wings where the air turbines 16 are located.

The numeral 17 indicates the gasoline engine or motor that drives a shaft 18 journaled in a ball-bearing support 19, in each wing 6, and on which shaft the propeller 20 is mounted. The air turbines 16 are connected in driving relation with the propeller shafts 18 so that upon rotation of the turbines by the air forced through the air tunnel 14—15, this will be utilized in operating the propellers.

When the airplane is started on the ground, the damper 9 is preferably closed by rotation of the shaft 13 and pinion 12 to dispose the slots 8 and 10 out of axial alignment with each other. This would prevent the air from passing through the grill and air tunnel during take-off. When it is desired to utilize the rotation of the propellers by the air turbines 16, the pilot opens the shutter 9 and admits air to the air tunnel 14—15, which air will be used in conjunction with the engines to maintain the stability of the aircraft, by aiding in maintaining the rotation of the propellers when the engines are throttled and thereby prevent the engines from stalling completely, when in a dive or the like, and completely upsetting the stability of the aircraft in yaw which could occur should one of the propellers stop.

I claim:

In a propulsion system for an aircraft comprising a fuselage, wings on the fuselage, a plurality of units including an engine, turbine and propeller mounted in said wings, said system including means forming an opening in the nose of said fuselage, a shutter means for said opening and a duct system connected to said opening, including a centrally located duct portion in the nose of said fuselage terminating in branch ducts extending transversely of said fuselage to said wing mounted units, said duct system tapering uniformly in cross section throughout said central portion and branch portions, said shutter means including an internal ring gear on said shutter, and a spur gear meshing therewith adapted to open and close said shutter.

ROBERT P. MARTIN.

REFERENCES CITED

The following references are of record in the file of this patent:

UNITED STATES PATENTS

| Number | Name | Date |
|---|---|---|
| 1,245,902 | Gretsky | Nov. 6, 1917 |
| 1,382,535 | Offen | June 21, 1921 |
| 1,773,340 | Bell | Aug. 19, 1930 |
| 1,886,327 | Carlson | Nov. 1, 1932 |
| 1,908,726 | Beisel et al. | May 16, 1933 |
| 2,077,708 | Morse | Apr. 20, 1937 |
| 2,160,281 | Price | May 30, 1939 |
| 2,164,545 | Rogers | July 4, 1939 |
| 2,252,528 | Sikorsky et al. | Aug. 12, 1941 |
| 1,845,950 | Woolsen | Feb. 16, 1932 |

FOREIGN PATENTS

| Number | Country | Date |
|---|---|---|
| 91,848 | Sweden | Jan. 20, 1938 |
| 165,310 | Great Britain | June 30, 1921 |